H. D. F. HILLIARD.
AUXILIARY LEAF SPRING FOR MOTOR VEHICLES.
APPLICATION FILED OCT. 7, 1916. RENEWED JAN. 28, 1919.
1,297,167.
Patented Mar. 11, 1919.
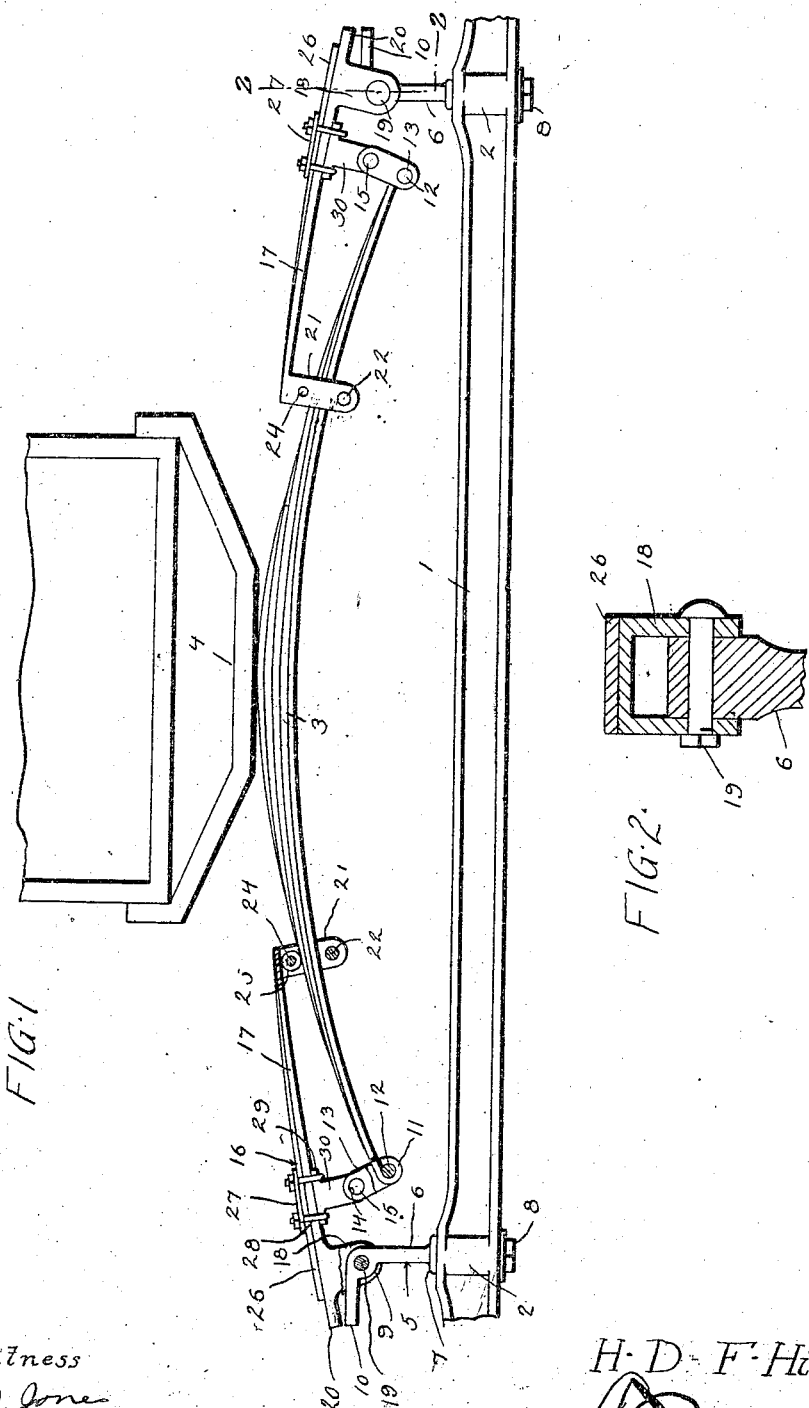
Witness
Inventor
H. D. F. Hilliard
By
Attorney

UNITED STATES PATENT OFFICE.

HARRY D. F. HILLIARD, OF KANSAS CITY, KANSAS, ASSIGNOR TO F. N WINSLOW, OF CARMEN, OKLAHOMA.

AUXILIARY LEAF-SPRING FOR MOTOR-VEHICLES.

1,297,167.

Specification of Letters Patent.

Patented Mar. 11, 1919.

Application filed October 7, 1916, Serial No. 124,296. Renewed January 28, 1919. Serial No. 274,179.

*To all whom it may concern:*

Be it known that I, HARRY D. F. HILLIARD, a citizen of the United States, residing at Kansas City, in the county of Wyandotte and State of Kansas, have invented certain new and useful Improvements in Auxiliary Leaf-Springs for Motor-Vehicles; and I do hereby declare the following to be a full, clear, and exact description of the invention, such as will enable others skilled in the art to which it appertains to make and use the same.

This invention relates to new and useful improvements in auxiliary leaf springs for motor vehicles and the principal object of the invention is to provide a spring which is adapted to be attached to the ordinary spring suspension of the vehicle in order to improve the riding qualities thereof and relieve the chassis and the body of much of the strain due to travel over rough roads.

Another object of the invention is to provide a shock absorber or auxiliary spring of the cantaliver type which is arranged to be connected to the end of the main vehicle spring and to the running gear without materially changing or modifying the construction of the vehicle.

A still further object of the invention is to provide an auxiliary spring which is rockably mounted on the axle of the vehicle and has its opposite end slidably connected to the main vehicle spring in such a way that when the main spring tends to straighten the end of the auxiliary spring will be free to move over the main spring thereby absorbing much of the force which would ordinarily be transmitted to the main spring in the longitudinal movement.

A still further object of the invention is to provide an auxiliary spring which is arranged to counteract the rebound of the main spring thus making a smoother riding structure.

With these and other objects in view the invention consists in the novel combination and arrangement of parts which will be fully set forth in the following specification and accompanying drawing, in which:—

Figure 1 is a front elevation of a portion of a motor vehicle showing this auxiliary leaf spring applied thereto, and Fig. 2 is an enlarged sectional view taken on line 2—2 of Fig. 1.

Referring to the drawing, the numeral 1 designates the axle of the vehicle provided near opposite ends with the sockets 2. The main vehicle spring is designated by the numeral 3 and is connected centrally to the vehicle body 4 while the ends of said spring are positioned directly over the axle 1 and in close proximity to the sockets 2. Seated in the sockets 2 are the perches 5 consisting of the standards 6 formed intermediate their ends with shoulders 7 and at their lower ends with suitable threads on which the nuts 8 are threaded. The upper ends of the standards are provided with apertured enlargements 9 and right angularly extending arms 10, the use of which will appear as the description proceeds.

The spring 3 is formed near opposite ends with loops 11 for the reception of suitable bolts 12 by means of which the links 13 are pivotally connected thereto. These links 13 are formed near the end opposite that which is connected to the bolts 12 with suitable apertures 14 for the reception of bolts 15 forming the connection of the main spring with the auxiliary spring.

The auxiliary spring is designated generally by the numeral 16 and comprises a main or bottom leaf 17 which tapers toward one end and is provided adjacent its larger end with a pair of downturned ears 18 which are formed integrally therewith and provided with apertures for the reception of the pivot bolts 19 which extend through the apertures in the head 9 and form a pivotal connection of the auxiliary spring with the perch. The extreme rear end of the main leaf 17 is extended as at 20 and coöperates with the arm 10 in modifying the rebound of the spring structure.

The forward or reduced end of the leaf 17 is formed with a pair of downturned ears 21, the lower ends of which are connected by a bolt 22 which coöperates with said ears in forming a yoke for completely surrounding the main spring 3. A bolt 24 extends through the ears 21 near the point where they join leaf 17 and a roller 25 is mounted on the bolt 24 to engage the upper side of the main spring 3. It will thus be seen that under normal conditions, the bolt 22 is spaced downwardly from the bottom leaf of the main spring 3 so that the straightening of said main spring will allow the yoke to move freely toward the central or enlarged portion of spring in absorbing the energy of the rebound. A spring leaf 26 is positioned on the upper side of the spring leaf 17 and a plate 27 is superimposed upon the leaf 26 near the larger end of the leaf 17 which plates extends beyond the side edges of the leaves and is apertured to receive the arms of the U-bolts 28 the bight portions of which extend beneath the leaf 17 and engage the lugs 29 formed at the base of the standard 30, the lower end of which is apertured to receive the bolts 15 so as to provide a pivotal connection between the end of the main spring 3 and the intermediate portion of the auxiliary spring 16.

It will be apparent from the foregoing that in use, when the axle 1 moves upwardly under the force of the impact of the wheel of the vehicle against an obstacle in a roadway it will be seen that the spring 16 will tend to rock on the pivot bolt 19 and such rocking action will cause the yoke formed by the ears 21 and the bolt 22 to move toward the center of the main spring 3 as said main spring will tend to straighten and thus the road shock will be distributed through the various movements of the spring. Upon the rebound of the springs, it will be seen that the extension 20 of the spring 16 will contact with the arm 10 of the perch 5 and thus the shock will be absorbed to a great extent.

While in the foregoing there has been shown and described the preferred embodiment of this invention, it is to be understood that such changes may be made in the combination and arrangement of parts as will fall within the spirit and scope of the invention as claimed.

What is claimed is:—

The combination with an axle, perches extending upwardly from the axle adjacent opposite ends thereof, a bowed main spring positioned directly over the axle, and arms extending outwardly from the perches toward the ends of the axle, of auxiliary springs each comprising a main leaf, ears formed on the main leaf of each auxiliary spring and extending downwardly therefrom, pivots connecting the ears to the perches, ears extending downwardly from each auxiliary spring near the end opposite that which is pivotally connected to the perches, a roller mounted between the last mentioned ears and bearing on the upper side of the main spring, and an extension on each auxiliary spring for coöperation with the arm on its respective perch to retard the rebound.

In testimony whereof I affix my signature in presence of two witnesses.

HARRY D. F. HILLIARD.

Witnesses:
HARRY W. CLARK,
SMITH J. FIGLEY.